US008983152B2

(12) United States Patent
Lewis et al.

(10) Patent No.: US 8,983,152 B2
(45) Date of Patent: Mar. 17, 2015

(54) IMAGE MASKS FOR FACE-RELATED SELECTION AND PROCESSING IN IMAGES

(71) Applicant: Google Inc., Mountain View, CA (US)

(72) Inventors: Justin Lewis, Marina Del Rey, CA (US); Gavin James, Los Angeles, CA (US); Grayson Lang, Santa Clara, CA (US); Aravind Krishnaswamy, San Jose, CA (US); Sevket Derin Babacan, San Franciso, CA (US)

(73) Assignee: Google Inc., Mountain View, CA (US)

( * ) Notice: Subject to any disclaimer, the term of this patent is extended or adjusted under 35 U.S.C. 154(b) by 48 days.

(21) Appl. No.: 13/894,384

(22) Filed: May 14, 2013

(65) Prior Publication Data
US 2014/0341442 A1 Nov. 20, 2014

(51) Int. Cl.
G06K 9/00 (2006.01)
G06T 5/00 (2006.01)
(52) U.S. Cl.
CPC .............. *G06T 5/00* (2013.01); *G06K 9/00234* (2013.01)
USPC ....................................................... 382/118
(58) Field of Classification Search
USPC ....................................................... 382/118
See application file for complete search history.

(56) References Cited

U.S. PATENT DOCUMENTS

| 4,203,671 | A | 5/1980 | Akimoto et al. |
| 6,263,113 | B1 | 7/2001 | Abdel-Mottaleb |
| 6,690,822 | B1 | 2/2004 | Chen |
| 7,587,083 | B2 | 9/2009 | Kishiba et al. |
| 7,916,905 | B2 | 3/2011 | Quach et al. |
| 8,218,862 | B2 | 7/2012 | Demirli |
| 8,295,557 | B2 | 10/2012 | Wang |
| 8,311,355 | B2 | 11/2012 | Brunner |
| 8,385,609 | B2 | 2/2013 | Piramuthu |
| 2007/0110305 | A1 | 5/2007 | Corcoran |
| 2009/0041297 | A1 | 2/2009 | Zhang |
| 2013/0044947 | A1 | 2/2013 | Brandt |
| 2013/0077823 | A1 | 3/2013 | Mestha |

OTHER PUBLICATIONS

Michael Jones et al.; "Statistical Color Models with Application to Skin Detection" International Journal of Computer Vision, vol. 46; Jan. 1, 2002; pp. 81-96.
European Patent Office (EPO); International Search Report, PCT/US2014/037934 Oct. 2, 2014; 4 Pages.

*Primary Examiner* — Duy M Dang
(74) *Attorney, Agent, or Firm* — IP Spring

(57) ABSTRACT

In some implementations, a method includes identifying one or more face regions of an image, the face regions including pixels that depict at least a portion of one or more faces of persons. The face regions are identified based on identifying facial landmarks of the faces. The method determines an associated face mask for each of the faces based on the face regions, where each face mask indicates which pixels in the image depict the corresponding face. Face pixels can be selected for processing by applying the face masks, and image pixels outside the faces can be selected by inversely applying the face masks. The selected pixels can be provided to a processing operation for adjustment of the selected pixels.

20 Claims, 9 Drawing Sheets

IMAGE MASKS FOR FACE-RELATED SELECTION AND PROCESSING IN IMAGES

BACKGROUND

The popularity and convenience of digital cameras as well as the widespread of use of Internet communications have caused user-produced images such as photographs to become ubiquitous. For example, users of Internet platforms and services such as email, bulletin boards, forums, and social networking services post images for themselves and others to see. Many users, however, would like to adjust their images to change or emphasize particular subjects or areas in photos. In some examples, users want to bring out particular details, provide more natural colors, or make other similar adjustments in images, and/or may want to de-emphasize particular portions or subjects depicted in an image, such as smoothing or blurring particular details.

SUMMARY

Implementations of the present application relate to image masks for faces depicted in images, and the use of such masks to make adjustments in images. In some implementations, a method includes identifying one or more face regions of an image, the face regions including pixels that depict at least a portion of one or more faces of one or more persons. The face regions are identified based on identifying facial landmarks of the faces. The method determines an associated face mask for each of the faces based on the face regions, where each face mask indicates which pixels in the image depict the corresponding face. The image pixels outside the faces are selected by inversely applying the face masks, and the selected pixels are provided to a processing operation for adjustment of the selected pixels.

Various implementations and examples of the method are described. An associated face mask includes adding connected face pixels to each face region, where the associated face mask includes approximately the entire corresponding face of a person. For example, a blobbing technique can adds contiguous skin pixels outside each face region to each face region in response to the pixel color being within a predetermined threshold of a color of one or more other pixels adjacent to the pixels. In another implementation, determining the associated face mask includes determining an average color of pixels within the face region, determining a spatial face area approximately defining the associated face of the corresponding person, and selecting pixels in the spatial face area that are similar in color to the average color and designating in the face mask that the selected pixels are face pixels. The pixels for which the average color is determined can be pixels selected as being within a predetermined range of known skin colors. Determining a spatial face mask area can includes estimating width and height for the spatial face mask area based on predetermined average facial proportions of a plurality of people. A falloff region for the face mask can be provided in which pixels are designated to be processed by a gradually lessening amount in a direction from a face area to the portions of the image outside the face area. In some examples, the processing operation can include applying a Gaussian blur to the selected pixels and/or applying a local contrast enhancement to the selected pixels.

A method can include, in some implementations, identifying a face region within an image, where the face region including pixels that depict at least a portion of a face of a person. The method selects pixels within the face region that are within a predetermined range of colors known to be skin colors. A characteristic skin color is determined for the selected pixels in the face region. A face mask is determined for the image, the face mask indicating which pixels in the image are skin pixels depicting the person's skin based on a color threshold similarity to the characteristic skin color.

Various implementations and examples of the above method are described. The characteristic skin color can be an average color of the selected pixels in the face region. The method can further determine an indication of a distribution of colors of the selected pixels in the face region, such as a standard deviation, where the distribution is used in determining a color distance threshold used in the color threshold similarity to the characteristic skin color. The face region can be identified based on facial recognition of one or more facial landmarks of the face.

Each pixel in the face mask can indicate a degree to which a corresponding pixel in the image is similar to the characteristic skin color and a degree of processing for the corresponding pixel. For example, three or more degrees of similarity can be indicated in the face mask. Selecting pixels can include converting colors of the pixels in the face region to a different color space, and checking which pixels in the face region have colors included in at least one predetermined range of the color space indicative of the known skin colors, where pixels having colors outside the predetermined area are excluded from the selection. A spatial face area can be determined in the image based on facial landmarks provided from the identified face region. The spatial face area can approximately define the face of the person, where the skin pixels in the face mask are limited to pixels within the spatial face area. A falloff area can be determined outside the spatial face area, where the pixels in the falloff area are forced to have a gradation of less processing than the pixels in the spatial face area. The method can include adjusting the skin pixels of the image as designated by the face mask, where the adjustment includes a blurring filter to smooth one or more depicted features of the face in the image. The method can include inverting the face mask and adjusting the pixels that are not skin pixels of the face mask to process the image.

In some implementations, a system can include a storage device and at least one processor accessing the storage device and operative to perform operations. The operations include identifying a face region within an image, the face region including pixels that depict at least a portion of a face of a person. The operations select pixels within the face region that are within a predetermined range of colors known to be skin colors. A characteristic skin color is determined for the selected pixels in the face region. A face mask is determined for the image indicating which pixels in the image are skin pixels depicting the person's skin based on a color threshold similarity to the characteristic skin color.

DETAILED DESCRIPTION

Figure 1:
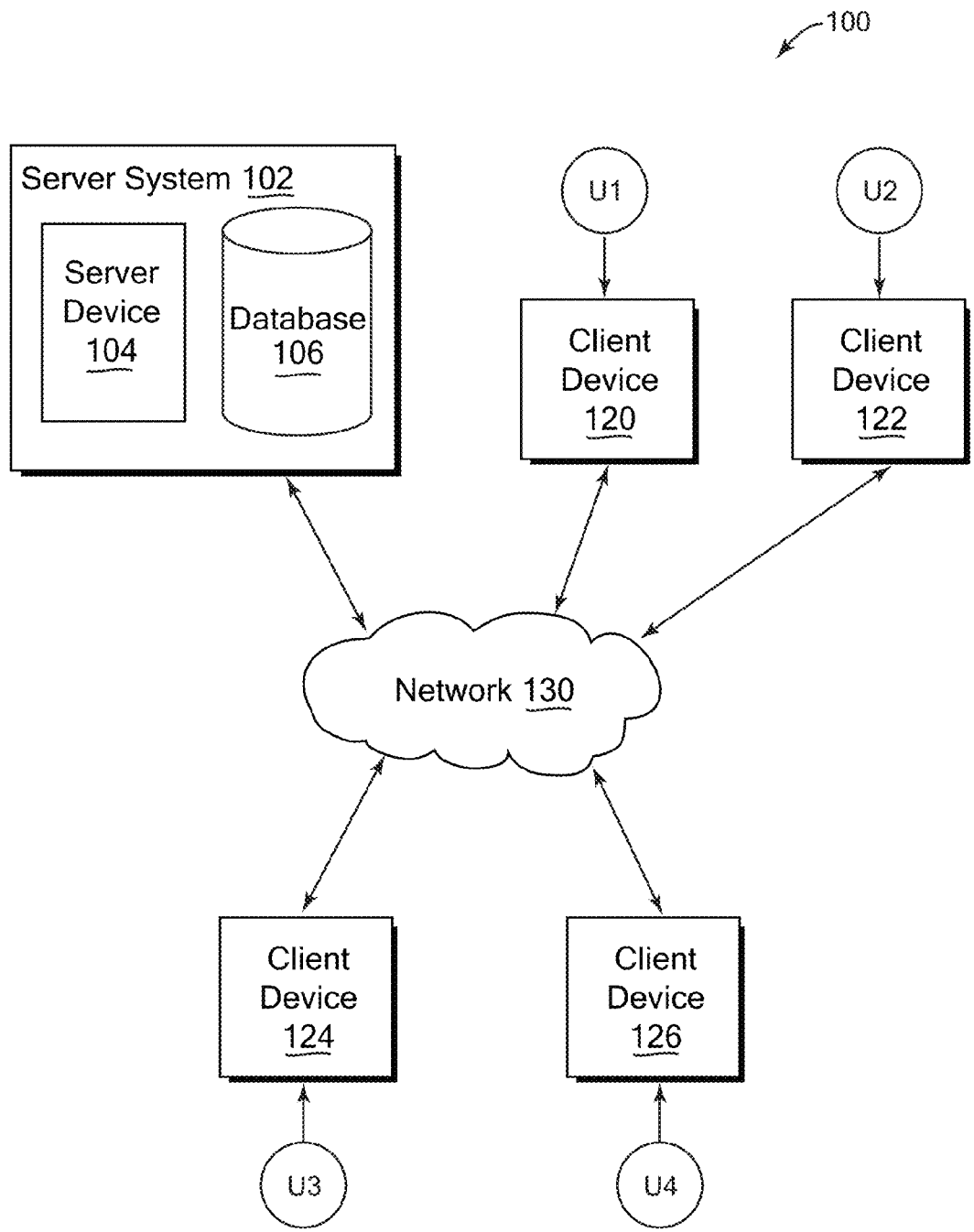
FIG. 1 is a block diagram of an example network environment which may be used for one or more implementations described herein.

One or more implementations described herein relate to image masks for faces depicted in images, and the use of such masks to make adjustments in images. In some implementations, one or more face regions are identified in an image, and an associated face mask is determined for each face region. The face mask indicates which pixels in the image depict the corresponding face, e.g., the skin of a face. In some implementations, the face mask can be determined using one or more techniques described herein. To adjust the face in the image, such as the skin of the face, the system can select and adjust the image pixels corresponding to face pixels in the face mask while excluding other pixels in the image. To adjust the portions of the image not included in the face, such as a background in the image, the system can select and adjust the image pixels corresponding to mask non-face pixels while excluding face pixels. These and other described features can lead to automatically-determined and well-defined adjustments to particular portions of images without modifying undesired portions.

The system can identify one or more face regions of an image that include pixels that depict faces or portions of faces. The face regions can be identified using facial recognition techniques which, for example, can use and provide facial landmarks for the detected faces, such as eyes and mouth indications. Face pixels can be determined for each face based on the face regions.

In some implementations, a face mask is determined by selecting pixels within the face region that are within a predetermined range of colors known to be skin colors. For example, the pixel colors can be converted to a particular color space and checked as to which ones have colors included in a predetermined range of the color space indicative of known skin tones. A characteristic skin color is determined for the selected pixels having colors in the predetermined range, such as by averaging the colors. The system determines a face image mask for the image that indicates which pixels in the image are skin pixels depicting the person's skin. The system can determine the skin pixels based on a threshold similarity in color to the characteristic skin color. In some examples, a distribution of colors of the selected pixels in the face region can be used in determining a color distance threshold used for checking the similarity to the characteristic skin color. Some examples can determine a spatial face area in the image based on facial landmarks from the face region, where the spatial face area approximately defines the entire face of the person, and the skin pixels are determined from pixels in the spatial face area. Such implementations can be used to determine a face mask of the user that does not include non-skin portions in face pixels, such as eyes and mouth. The mask can also be inverted and used to select portions of the image outside the face pixels.

Other implementations can determine the face mask in other ways. For example, the system can start from the face region in the face mask and increase a size of the face region to expand the face pixels to include approximately the entire face of a person. In some implementations, the system can use a blobbing technique to add color-similar skin pixels outside the face region, where each additional skin pixel is connected to the face region directly or through other skin pixels. Other implementations can use other techniques, such as finding clusters in the image of pixels having a color similar to a skin color, and adding clusters to the face pixel area that are connected to the face region. Some implementations can provide masks that include people's faces as well as depicted skin areas of people other than faces.

After determining the face mask, if the system is to adjust one or more faces (such as adjusting the skin of the face) in the image, the image pixels corresponding to the mask face pixels are selected while other pixels in the image are excluded from selection. The face pixels are provided to a processing operation for adjustment, such as a smoothing operation. If the system is to adjust the portions of the image that are not included in the face, such as a background in the image, then the non-face image pixels are selected while pixels corresponding to mask face pixels are excluded, and the selected non-face pixels are provided to a processing operation for adjustment, such as blurring or contrast enhancement.

Such features can allow, in some implementations, automated adjustment and enhancement of particular portions of images while providing protection to other portions of the images which may be degraded in visual quality from such adjustment. For example, skin of a user's face can be smoothed without blurring other features of the image, such as non-skin portions of the face and non-face portions such as the background. Similarly, non-face portions of the image can be adjusted and enhanced without affecting faces depicted in the image. The user can avoid tedious manual examination and adjustment of each image. In some implementations, the use of identified face regions indicating facial landmarks of faces as well as skin color comparisons allows more accurate generation of a face image mask and robust selection of faces and skin.

FIG. 1 illustrates a block diagram of an example network environment 100, which may be used in some implementations described herein. In some implementations, network environment 100 includes one or more server systems, such as server system 102 in the example of FIG. 1. Server system 102 can communicate with a network 130, for example. Server system 102 can include a server device 104 and a database 106 or other storage device. Network environment 100 also can include one or more client devices, such as client devices 120, 122, 124, and 126, which may communicate with each other via network 130 and/or server system 102. Network 130 can be any type of communication network, including one or more of the Internet, local area networks (LAN), wireless networks, switch or hub connections, etc.

For ease of illustration, FIG. 1 shows one block for server system 102, server device 104, and database 106, and shows four blocks for client devices 120, 122, 124, and 126. Server blocks 102, 104, and 106 may represent multiple systems, server devices, and network databases, and the blocks can be provided in different configurations than shown. For example, server system 102 can represent multiple server systems that can communicate with other server systems via the network 130. In another example, database 106 and/or other storage devices can be provided in server system block(s) that are separate from server device 104 and can communicate with server device 104 and other server systems via network 130. Also, there may be any number of client devices. Each client device can be any type of electronic device, such as a computer system, portable device, cell phone, smart phone, tablet computer, television, TV set top box or entertainment device, personal digital assistant (PDA), media player, game device, etc. In other implementations, network environment 100 may not have all of the components shown and/or may have other elements including other types of elements instead of, or in addition to, those described herein.

In various implementations, end-users U1, U2, U3, and U4 may communicate with the server system 102 and/or each other using respective client devices 120, 122, 124, and 126. In one example, users U1, U2, U3, and U4 may interact with each other via a social network service implemented on server system 102, where respective client devices 120, 122, 124, and 126 transmit communications and data to one or more server systems such as system 102, and the server system 102 provides appropriate data to the client devices such that each client device can receive shared content uploaded to the social network service via the server system 102. In some examples, the social network service can include any system allowing users to perform a variety of communications, form links and associations, upload and post shared content, and/or perform other socially-related functions. For example, the social network service can allow a user to send messages to particular or multiple other users, form social links in the form of associations to other users within the social network system, group other users in user lists, friends lists, or other user groups, post or send content including text, images, video sequences, audio sequences or recordings, or other types of content for access by designated sets of users of the social network service, send multimedia information and other information to other users of the social network service, participate in live video, audio, and/or text chat with other users of the service, etc. As used herein, the term "social networking service" can include a software and/or hardware system that facilitates user interactions, and can include a service implemented on a network system. In some implementations, a "user" can include one or more programs or virtual entities, as well as persons that interface with the system or network.

A user interface can enable display of images and other content as well as communications, privacy settings, notifications, and other data on a client device 120, 122, 124, and 126. Such an interface can be displayed using software on the client device, such as application software or client software in communication with the server system. The interface can be displayed on an output device of a client device, such as a display screen.

Other implementations can use any type of system and service. For example, users accessing any type of electronic device can make use of features described herein. Some implementations can provide features described herein on client or server systems disconnected from or intermittently connected to computer networks. In some examples, a client device having a display screen can display images and provide features and results as described herein that are viewable to a user.

Figure 2:
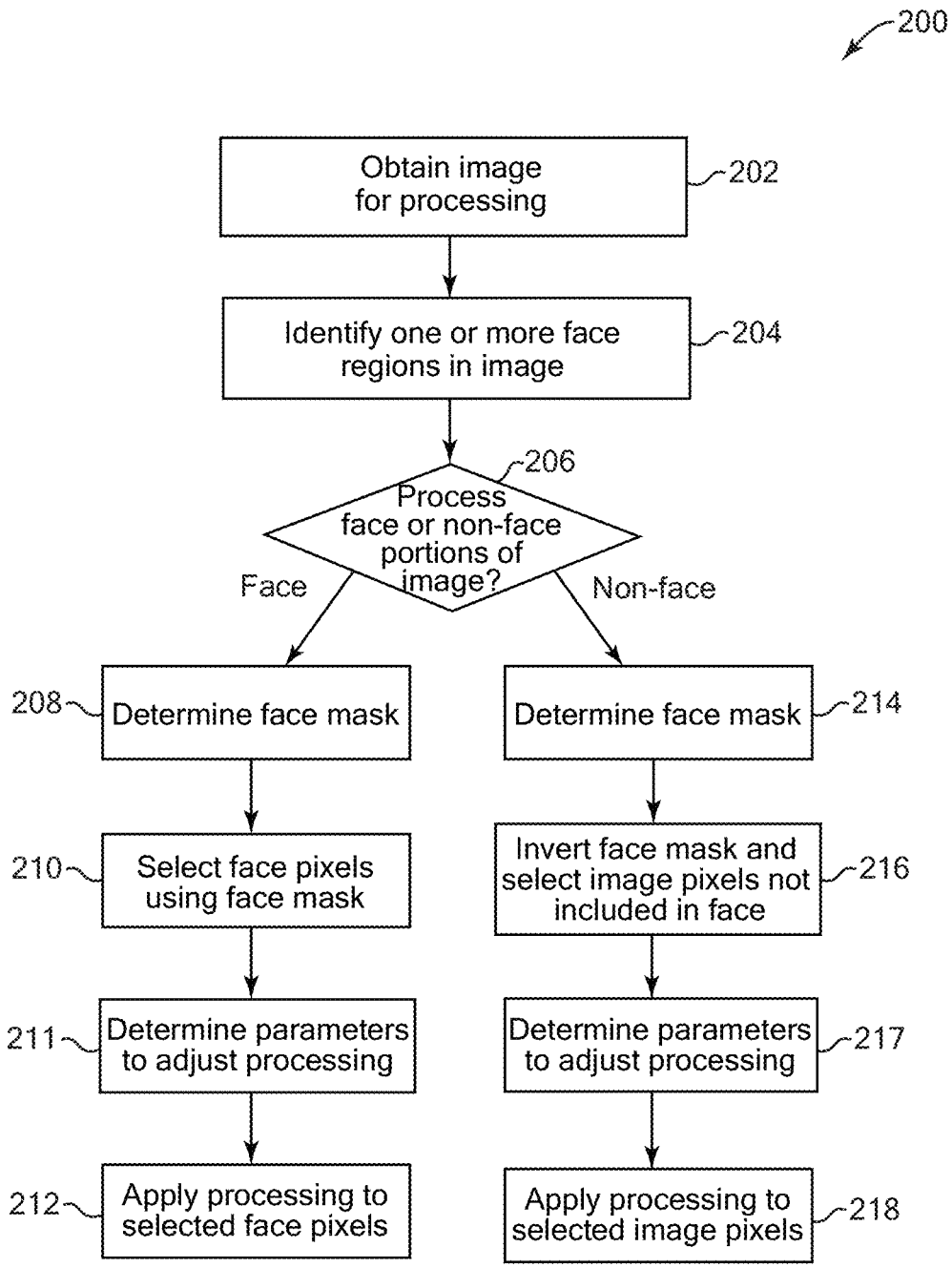
FIG. 2 is a flow diagram illustrating an example method for providing a face image mask and using a face image mask to make adjustments in images of images, according to some implementations.

FIG. 2 is a flow diagram illustrating one example of a method 200 for providing a face image mask and using a face image mask to make adjustments in images. In some implementations, method 200 can be implemented, for example, on a server system 102 as shown in FIG. 1. In other implementations, some or all of the method 200 can be implemented on a system such as one or more client devices. In described examples, the system includes one or more processors or processing circuitry, and one or more storage devices such as a database 106 or other storage. In some implementations, different components of one or more servers and/or clients can perform different blocks or other parts of the method 200. Method 200 can be implemented by program instructions or code, which can be implemented by one or more processors, such as microprocessors or other processing circuitry and can be stored on a computer readable medium, such as a magnetic, optical, electromagnetic, or semiconductor storage medium, including semiconductor or solid state memory, magnetic tape, a removable computer diskette, a random access memory (RAM), a read-only memory (ROM), flash memory, a rigid magnetic disk, an optical disk, a solid-state memory drive, etc. Alternatively, these methods can be implemented in hardware (logic gates, etc.), or in a combination of hardware and software. The method 200 can be performed as part of or component of an application running on the system, or as an application or software running in conjunction with other applications and operating system.

In some implementations, the method 200 can be initiated automatically by the system. For example, the method can be periodically performed, or performed based on a particular event such as one or more original images being newly uploaded to or accessible by the system, or a condition specified in custom preferences of one or more users of the system. Some implementations can initiate method 200 based on user input. A user may, for example, have selected the initiation of the method 200 from an interface such as a social networking interface or other graphical interface.

In block 202 of method 200, the method obtains an image for processing. The image can be a digital image composed of multiple pixels, for example, and can be stored on one or more storage devices of the system or otherwise accessible to the system, such as a connected storage device, e.g., a local storage device or storage device connected over a network. In various implementations, the image can be automatically selected by the method, e.g., as an image from an album or other collection of multiple images, such as an album provided in an account of a user of a social networking system. In some implementations, the system can determine which image is obtained based on evaluating one or more characteristics of accessible images, such as the color distributions of images, timestamps and other metadata of images, and/or identified and recognized content depicted in the images, such as persons, faces, or objects. Alternatively, a user can provide or designate one or more images to process.

In block 204, the method identifies one or more face regions in the image. In some implementations, face regions can be determined by object recognition techniques for images, such as facial recognition. In some implementations, method 200 can implement facial recognition in block 204 to identify the face regions in the image. For example, method 200 can send the obtained image to a facial recognizer implemented on the system or a connected system, and receive facial recognition results from the recognizer. The facial recognizer can recognize a face using any of multiple techniques. In some examples, the recognizer can identify an object as a human face by identifying facial landmarks (and/or other features) having a known general shape or profile and spatially located in the image, such as eyes, nose, and mouth, and having a known spatial relationship with each other (e.g., mouth being below eyes, etc.) and/or with other identifiable features (such as other head features, body features, etc.). The recognizer can in some implementations recognize a face in an image without finding the identity of the person who is depicted. Some facial recognizers can provide face location data such as coordinates of a face polygon that indicate a face region based on such identified facial landmarks. Such an output face region can be the identified face region in block 204, or can be the basis of the identified face region. Some implementations can further determine a spatial face area in block 204 that more precisely defines a depicted face in the image than the identified face region, e.g., using similar techniques as described below with respect to FIG. 3 to determine a spatial face region.

Furthermore, other facial information besides the face location data (e.g., face polygon) can be provided by the facial recognizer or other face identification process. For example, the facial recognizer can provide as output the locations of the facial landmarks found in the face for the facial identification process. For example, spatial coordinates of one or more of the facial landmarks can be provided, such as the mid-point of each eye, left and right endpoints of the eyes, two or more points indicating the spatial extent of the mouth, a mid-point of the nose, etc. In addition, information can be provided from a recognizer or other analysis which indicates an identified angle of orientation of the face relative to the plane of the image, such as whether the face is being depicted directly facing the plane of the image or is angled and looking to one side.

In addition, some implementations can provide characteristic information about the face or person that was identified by the recognizer, such as estimated age, gender, and other characteristics of the person whose face is being depicted. Such information can be used in determining a face mask as described below. In some examples, a facial recognizer can identify a face and recognize the identity of the person being depicted based on data from a social networking service or other data service or storage, and from the identity the system can determine age, gender, or other user characteristics. For example, such characteristic information can be determined without finding the identity of the depicted person, or the person's identity can also be determined for more precise information. In some implementations, access to personal information including user characteristics such as age, gender, identity, etc., may be restricted based on users' control and preferences governing such information.

In block 206, the method checks whether face portions of the image will be processed (such as skin) or whether the non-face portions of the image will be processed, such as background areas. This decision can be determined automatically by the method or can be designated by a user. For example, in an automated process the method can process one type of image portion, such as faces, in a particular way in all images from a particular collection and/or having predetermined characteristics, and/or can process other portions or types of portions of the images based on similar criteria. User preferences can be used to determine how images are to be processed, including which portions to process. In some implementations, a user can provide input indicating whether facial or non-facial portions of the image are to be processed.

If the face portions in the image are to be processed, then the method continues to block 208, where a face image mask for the image is determined. The face mask is a pixel map having mask pixels corresponding to the image pixels, where each mask pixel indicates whether the corresponding image pixel is a face pixel. Any of multiple different techniques can be used to determine the face mask in particular implementations. For example, in some cases the determined face mask can be a skin mask which indicates which pixels of the image belong to the skin of depicted persons' faces, where the skin pixels do not include pixels depicting other facial features such as eyes and mouth. This allows adjustment to the skin pixels to be performed without adjusting eyes, mouth, and other facial features, such as for skin smoothing. Some implementations for determining a facial skin mask are described below with respect to FIG. 3. Other example implementations for determining a face image mask can designate which pixels in the image belong to a person's face, including any non-skin facial features. Some examples of such implementations are described below with respect to FIG. 5. Some implementations can use the same mask determination method regardless of which image portions are to be processed, while other implementations can select a particular face mask determination method in block 208 for use with processing the user's face (e.g., the method of FIG. 3), and can select a different face mask determination method for processing non-facial pixels as in block 214 (e.g., the method of FIG. 5). Some implementations of block 208 can provide a mask that designates additional skin pixels, such as pixels depicting other portions of a person's exposed skin, e.g., bared arms, chest, and legs of the person.

In block 210, the method uses the face image mask resulting from block 208 to select face pixels of the depicted faces in the image. For example, the facial skin pixels in the faces can be selected if the face mask determined in block 208 is a skin mask, or the selected pixels can include facial features in addition to skin such as eyes, mouth, etc. In some implementations, the face pixels of all faces depicted in the image can be selected using the face mask. In other implementations, the selected face pixels are in a subset of faces depicted in the image, and one or more other faces have been excluded from selection. This allows a subset of faces to be processed by the method. For example, some implementations can examine user preferences for people that have been identified and associated with the depicted faces (such as users of a social networking system), and if those preferences indicate that the user does (in general) not want to have faces of particular depicted people adjusted, then those users' face pixels can be excluded from selection. Identification of users can be performed using facial recognition that can provide the face regions in block 202, for example. In one example, in a social networking service, a recognized face can be compared to faces of users of the service to identify which people depicted in images are also users of the service. Some images can be associated with identifiers such as tags that describe content depicted in the image, and these tags can be obtained or parsed as identifications of depicted content such as depicted persons.

In block 211, the method can determine parameters that will affect the processing of the selected pixels. For example, in some implementations, information about estimated characteristics of the depicted person associated with the face is received in block 202 and can be used to adjust particular types of processing of the person's face in the image, such as affecting particular types of filters. In some examples, an age characteristic and one or more age thresholds can be used to determine how much blurring is to be performed to the face, e.g., by a Gaussian blur filter or other blur filter. In one non-limiting example, for persons estimated to be age 40 or older there are no restrictions to the blur applied to their facial skin pixels, for persons estimated between ages 16 to 40 the amount of blur applied is scaled linearly down from full blur age 40 to zero blur at age 16, and for persons below age 16 there is no blurring applied. Similarly, gender of a face can be used to affect image processing. In one example, female faces can be blurred to the normal extent, and male faces can be blurred to a lesser extent, such as 75% of normal (e.g., so that facial features or characteristics such as beard stubble will not be too blurred, which may be undesirable). Other personal or face characteristics can also be used. Such determined parameters can be overridden by user-input parameters, in some implementations. Access to personal information including user characteristics such as age, gender, etc., may be restricted in some implementations as described above.

In block 212, the method applies one or more filters and/or other adjustments to the selected face pixels, e.g., using any parameters determined in block 211. This can be performed by the same system or software module performing the previous blocks, or can be performed by a different system or module. In some implementations, a varying amount of processing is performed on pixels based on the corresponding mask pixels. For example, the amount of processing can be based on a mask pixel color or other characteristic. In one example, white mask pixels can indicate full processing, black mask pixels can indicate no processing, and gray pixels can indicate partial processing based on the amount of gray in the mask pixel.

In some examples, applied filters can include a Gaussian blur filter, which can smooth particular features of facial skin, such as skin pores, pimples, wrinkles, or other facial features. Such a filter may not be desired to be applied to other pixels not depicting the person's facial skin, such as the person's eyes, lips, hair, clothes, and non-facial skin, as well as the background of the image that surrounds the person. These other pixels are not selected and therefore not filtered in block 212. In some implementations, some non-skin features such as eyes and mouth may be included as face pixels in the determined mask and may be adjusted with the facial skin. In another example, the applied filters can include a contrast and/or saturation adjustment to the selected pixels or other filter that adjusts the color, luminance, and/or sharpness of the selected pixels. This processing part of the method 200 is then complete. In some implementations, the method can also perform processing on the image in blocks 214-218 for non-face pixels using a determined face mask.

If the non-face portions in the image are to be processed as determined in block 206, then the method continues to block 214, where a face image mask for the image is determined. Similarly as described above for block 208, any of multiple different techniques can be used to determine the face mask in particular implementations. For example, in some implementations the mask can designate face pixels including non-skin features such as eyes and mouth, since it may be intended to process the image portions outside of persons' faces such as the background areas of the image. In other implementations, it may be desired to process all non-skin areas of the image, even eyes and mouths, in which case a facial skin mask can be determined to designate facial skin pixels. Some implementations can select a particular face mask determination method for use in block 214 when processing non-facial pixels, and can select a different face mask determination method if processing the user's face as in blocks 208-212. Example implementations are described below with respect to FIGS. 3 and 5. In some implementations, block 214 can provide a mask that designates additional pixels depicting other portions of a person's exposed skin, e.g., bared arms, chest, and legs of the person.

In block 216, the method inverts the face image mask resulting from block 214 to select pixels of the image that are not included in depicted faces in the image. In some implementations, inverting the face mask can include inversely applying the face mask to select the pixels of the image that are external to, outside, or excluding the image pixels within faces as defined by the face mask. Selecting the non-facial pixels can include selecting pixels in the image excluding the regions indicated as face pixels by the face mask. For example, the pixels of the background areas of the image can be selected, as well as pixels depicting persons' hair, clothes, bodies, and other portions not included in faces. In some implementations, the face mask from block 214 designates all facial features within the borders of a person's face, such as eyes, mouth, ears, etc. This allows all non-facial portions of the image outside the face to be selected. In other implementations, the face mask determined in block 214 is a facial skin mask and the selected pixels in block 216 can include non-skin facial features. In other cases, a skin mask can be used and non-skin facial features can be unselected since they are part of the face, e.g., if processing is desired only for the background portion of the image. For example, the method can unselect any pixels positioned within the boundaries of the face designated in the skin mask.

In some implementations, pixels in all faces depicted in the image are excluded from selection. In other implementations, pixels in a subset of depicted faces are excluded and pixels in one or more other depicted faces are selected in the operation of block 216, such that some faces can in effect be processed as part of the background. For example, a particular subset of faces may be desired to remain protected from the processing, while other faces can be processed similarly to the other non-facial portions of the image. In one example, a user may desire that only a particular person's face is to remain unblurred, while all the other pixels of the image are to be blurred, including other people's faces. In some implementations, identifications of faces and person identities can be used to inform which faces should be selected for processing, similarly as described above.

In block 217, the method can determine parameters that will affect the processing of the selected pixels. For example, in some implementations, information about estimated characteristics of the depicted person associated with the face is received in block 202 and can be used to adjust particular types of processing of non-face or non-skin pixels in the image, such as affecting particular types of filters. For example, some implementations may desire to process non-face pixels in an image only if the depicted faces or people are of a particular age, gender, or have some other characteristic.

In block 218, the method applies one or more adjustments, such as one or more filters and/or other adjustments, to the selected non-face image pixels. Adjustment is made to the regions of the image that are defined to be external to or excluding the depicted faces as designated by the face mask. This can be performed by the same system or software module performing the previous blocks, or can be performed by a different system or module. In some implementations, a varying amount of processing is performed on pixels based on the corresponding mask pixels similarly as described above.

In some examples, the filters can include a Gaussian blur filter. For example, the Gaussian filter can smooth background features of the image and exclude this processing on all face pixels to leave the faces clearly depicted. In another example, contrast adjustment can be used, such as local contrast enhancement processing to enhance contrast and details on non-facial pixels in the image. Such adjustment may be undesirable for people's faces because it can bring out undesired facial features such as skin pores and wrinkles. Such processing can use a determined face mask from block 216 that includes pixels for skin and non-skin facial features. In some implementations, processing may be desired to be excluded from facial skin but is desired for facial non-skin features, and so a facial skin mask can be used (e.g., as described with reference to FIG. 3). In another example, the filters can include a contrast and/or saturation adjustment to the pixels or other filter that adjusts the color, luminance, white balance, and/or sharpness of the pixels or depicted features not included in the determined face mask. Some implementations can perform de-noising on the non-face or non-facial-skin pixels, so that faces in the image will not be distorted by the de-noising process and/or will not be processed twice (e.g., faces can be processed for smoothing and then are excluded for de-noising performed on the non-face portions of the image). This processing part of the method 200 is then complete. In some implementations, the method can also perform processing on face mask pixels of the image in blocks 208-212.

In some implementations, the processing performed in method 200 can be performed on a server system or a client system, or on both systems. In one non-limiting example, a camera, cell phone, or other portable device captures an image and can perform the method 200. In addition, the portable device can send the captured image to a server over a network, and the server can process the image using method 200. In some implementations, the portable device can process a low resolution version of the image for faster processing, storage, and display on the portable device, while the server can process a higher-resolution version of the image and store the resulting processed hi-resolution image in a user account, e.g. a website, social networking system, etc.

In some implementations, the processing in blocks 212 and/or 218 can be performed in parallel. For example, the processing of the face pixels or facial skin pixels can be performed using one or more types of filters, and the processing of the non-face and/or non-facial skin pixels can be performed substantially or partially simultaneously using one or more other filters, allowing efficiency through parallelization.

Figure 3:
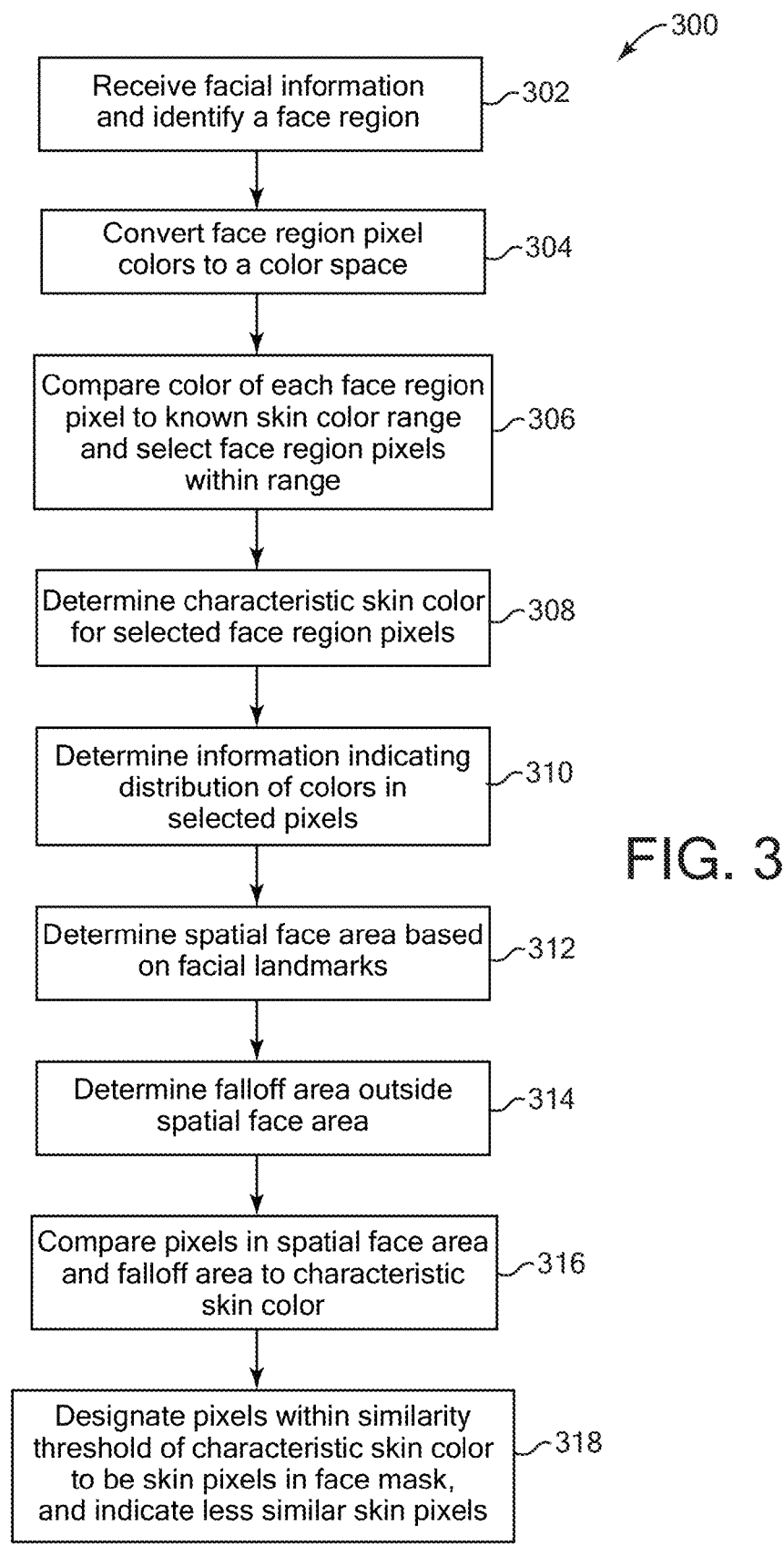
FIG. 3 is a flow diagram illustrating a method for determining a face image mask, such as a facial skin mask that indicates skin pixels of an image, according to some implementations.

FIG. 3 is a flow diagram illustrating a method 300 for determining a face image mask, such as a facial skin mask that indicates which pixels of an image depict a person's facial skin. Method 300 can be used, for example, in the method 200 of FIG. 2 to determine a face mask in blocks 310 and/or 316. Method 300 can be implemented by a system such as a server and/or client device as described above.

Figure 7:
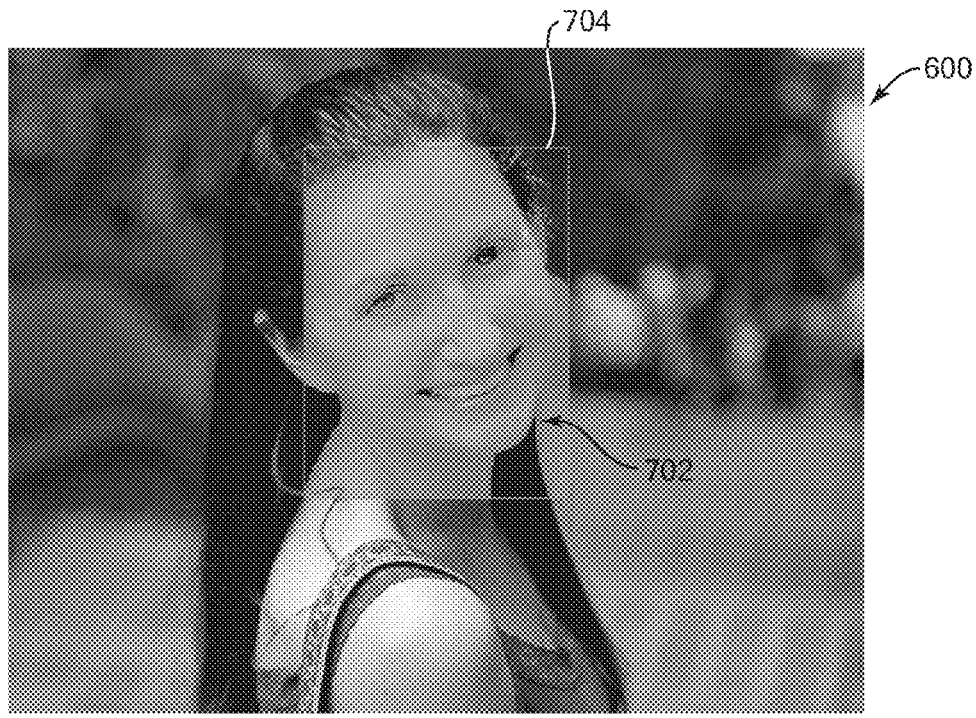

In block 302, the method receives facial information identifying a face region. For example, as described above for block 204 of the method 200, the facial information can describe an identified face that was recognized by a facial recognizer. In some implementations, the face region can be the region inside a face box provided by a facial recognizer, which can be a polygon, rectangle, or other shaped border surrounding landmark features of a face. For example, the face region can be a region that surrounds a person's eyes, cheekbones, nose, and mouth. FIG. 7, described below, shows one example of a face region, or a smaller region can be provided in other implementations (e.g., more closely surrounding the landmark features of eyes and mouth). The received facial information can also include other information about a face, including one or more coordinates or locations defining facial landmarks such as eyes and mouth. In some implementations, additional facial information can also be received, such as information indicating an orientation of the face relative to the image plane, e.g., whether the face is looking directly out of the plane of the image (e.g., at a camera taking the image), the face is oriented to be looking directly to a particular side, or the face is looking at a particular angle estimated from a reference direction.

In block 304, the method converts the colors of each of the pixels within the face region obtained in block 302 to a particular color space. In some examples, RGB (red-green-blue) other color model pixels can be converted to a YCbCr color space that indicates luminance (Y) and two chroma values (Cb and Cr). Such a color space allows examining the color aspects of pixels without the luminance or brightness component being included (unlike the case of RGB pixels). Other implementations can convert the pixel colors to other types of color spaces, such as the Lab (L*a*b) color space which similarly separates out a luminance or lightness component from pixel colors, or other color spaces such as HSV (hue, saturation value), etc.

In block 306, the method examines the converted colors of the pixels within the face region obtained in block 302, compares these colors to a predetermined range of known skin colors, and selects face region pixels that are found within the predetermined color range. In some implementations, the predetermined range of known skin colors can be defined as a predefined zone or area on a color space graph that indicates a desired range of known skin colors.

Figure 4:
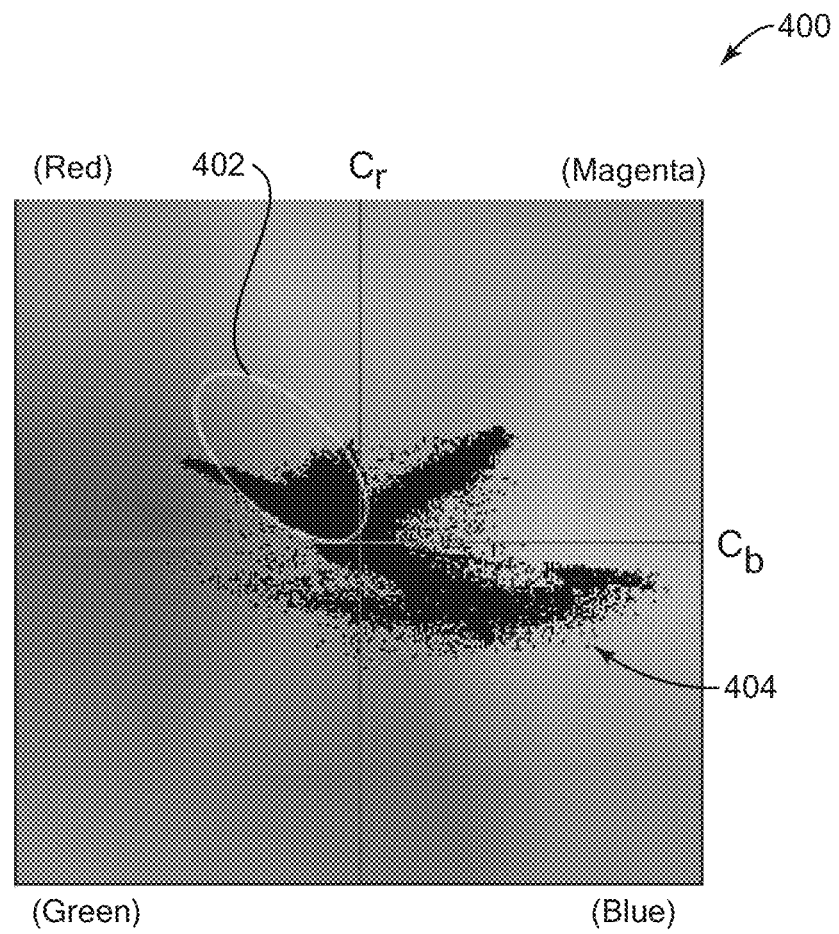
FIG. 4 is a diagrammatic illustration of a color space graph indicating a predetermined range of known skin colors.

For example, FIG. 4 is a diagrammatic illustration showing one example of a color space graph 400 provided in a YCbCr color space that indicates a predetermined range of known skin colors. The graph axes indicate the Cb (horizontal) and Cr (vertical) components of the color. An ellipse-shaped zone 402 is provided in the graph to indicate which combinations of Cb and Cr values are likely to be skin colors or tones. For example, the ellipse-shaped zone 402 can be in the upper left quadrant as shown in graph 400. In some implementations, the zone can be determined based on sampling and examining the skin colors of multiple persons in a population, such as a general population and/or a more specific set of people, where the persons can have a wide variety of different ethnicities and skin colors to include a wide range of actual skin colors. Sampling a large number and wide variety of images of people can also be used to obtain indications of where skin colors tend to congregate in a particular color space such that a zone such as zone 402 can be estimated.

In the example of FIG. 4, the pixel color distribution from a face region is shown as the points 404, such as from the face region example shown in FIGS. 6-10, described below. Some of these points 404 are outside the ellipse-shaped zone 402 and some points are inside the zone 402. The method selects the pixels in the face region that have colors within the predetermined color range, such as the pixels corresponding to the points 404 located in the zone 402. This selection provides pixels from the image that are much more likely to be depicting a person's skin. Thus, in one example, if a face region pixel has Cb and Cr values within the ellipse-shaped zone 402 of the color space graph 400 as shown in FIG. 4, that pixel is selected.

In some implementations, the method can also bound the selected face region pixels by performing edge tests to further narrow the pixels in the selected set. For example, the luminance of pixels can be compared to threshold values and pixels having a luminance below a lower threshold or above a higher threshold can be ignored and not selected. Such extremely dark or light pixels are much more likely to depict other facial features than skin. Such edge tests can also check if the saturation of the pixels is outside a predetermined threshold, and if so, remove such pixels from consideration. In some implementations, such edge tests can be performed before the face region pixels are compared to the predetermined color range in the color space in block 306, if such tests are less computationally expensive. In such a case, the color comparisons of block 306 can be performed on the eligible set of face region pixels that were not excluded by the edge test criteria.

Referring back to FIG. 3, in block 308, the method determines a characteristic skin color for the selected face region pixels. For example, in some implementations, the characteristic skin color is the average color of the selected face region pixels, e.g., the average color component in each of the three R, G, and B color channels for the selected pixels. In block 310, the method determines information about the distribution of colors within the set of selected face region pixels. In some examples, a standard deviation can be determined for each color channel. This information estimates how widely varying is the distribution of colors in the selected face region pixels.

In block 312, the method can determine a spatial face area based on facial landmarks and/or other facial information received in block 302. In some implementations, the spatial face area determined in block 312 can be a more accurate representation of the boundaries of the person's face than the face region received in block 302. For example, the face region can be an area that approximately surrounds particular landmarks of the face such as eyes, cheekbones, and mouth, and thus may not define the full extent of the face, and/or may include non-facial features such as hair, body parts, etc. The spatial face area can adjust such a face region to more accurately include the area of the person's face.

In some implementations, the spatial face area can be determined by examining facial landmarks and other received facial information and estimating a face and/or head size using known general proportions in faces and heads. Such facial landmarks can provide coordinates indicating the spatial extent and/or midpoints of the person's eyes and mouth, for example, as well as an estimated tip or mid-point for the nose. In some examples, the method can determine an eye width by estimating that the mid-points of the eyes are two eye-widths apart, and can estimate a width of the head by estimating the head as about 5 eye widths. The facial information can also include indications of how the face is oriented, e.g., looking directly out of the image or looking to one side and the extent of such orientation. This orientation information can be used to better estimate the distance between the eyes and size of the head based on foreshortening and other factors. Furthermore, the angle of the head and face within the plane of the image can be determined based on the angle of a line drawn through the eyes and/or the angle of the mouth. In some implementations, generally known data about the average size of heads relative to spacing of eyes and size and spacing of mouths can be further used to determine the estimation of the spatial face area. For example, generally known proportions of head and face size, and generally known ratios between different landmarks of faces, can be obtained or determined from data based on eye spacing and mouth spacing.

In some implementations, the estimated spatial face area can be elliptical in shape as an approximation of the shape of a face. Other shapes can be used in other implementations. The size of the estimate facial shape area can be conservatively dimensioned to be large to ensure that all of the facial skin pixels are included in the area.

In block 314, a falloff area can be determined outside of the spatial face area determined in block 316. The falloff area can be a "feathered" area of the mask that forces the image pixels within its area to be processed partially and not to the full extent that the pixels within the spatial face area are to be processed. For example, the pixels in the falloff area are evaluated for similarity to the characteristic skin color and are also designated to have an gradation of less processing than the pixels in the spatial face area. For example, the falloff area can be a zone extending out from the spatial face area by a predetermined amount. In one example, the falloff area can be the same shape as the spatial face area and is determined as a scaled version of the spatial face area, e.g., 1.5 times the size of the spatial face area and centered on the spatial face area, in one non-limiting example.

In some implementations, in the falloff area, the amount of processing to be performed can be designated to be a continuous gradient from 100% at the spatial face area towards 0% at the outer edge of the falloff area. In some implementations, the falloff in the falloff region can be non-linear, e.g., a steep dropoff toward 0% after a particular reduction amount. The falloff region allows a partially processed effect to be performed at the interface between the facial mask area and the non-face portions of the image, reducing any sharp contrasts or visible borders between these two portions of the image. In some implementations, such as some cases when using the inverse of the face mask to select non-face or non-skin pixels as in blocks 214-218 of FIG. 2, the falloff region may be omitted from the skin mask, e.g., such that all pixels in the falloff region are not considered facial skin pixels. For example, if the processing includes contrast enhancement of non-facial pixels, then the falloff area may not be needed.

In block 316, the method compares the pixels within the spatial face area and the falloff area to the characteristic skin color determined in block 308, and in block 318 the method designates particular mask pixels of the face mask to indicate facial skin pixels in the image. The designated mask pixels are those pixels corresponding to image pixels having a color within a threshold similarity to the characteristic skin color. For example, each of the three color channels of each pixel is checked to be within the threshold range. In some implementations, the threshold range is based on the distribution of colors of the pixels selected to determine the characteristic color in block 308. For example, the standard deviation of each color channel as determined in block 310 can be used as an indication of how wide is the color distribution in a channel, and the threshold range can be based on the standard deviation. For example, the larger the standard deviation, the larger the threshold range that can be used in block 318 to determine whether an image pixel in the spatial face area or falloff area is sufficiently similar to the characteristic color to be designated as a facial skin pixel in the face mask. In other implementations, the threshold range can be a predetermined range.

In some implementations, mask pixels indicating less similar skin pixels are also designated in the mask to indicate a reduced amount of processing to be performed on the corresponding image pixels. Each mask pixel in the spatial face area of the face mask can indicate a varying degree to which a corresponding pixel in the image is similar to the characteristic skin color and thereby indicate a degree of processing for the corresponding pixel. In some examples, multiple degrees of similarity can be indicated in the face mask by different designations, e.g., two, three, or more degrees of similarity. For example, a characteristic of the mask pixels such as color can be used to indicate partial similarity within the spatial face area. In one non-limiting example, the mask pixels representing image pixels within the threshold similarity of the characteristic skin color, as determined above, are considered full skin pixels and can be designated with an appropriate characteristic in the mask, such as a white color in this example. Furthermore, mask pixels having shades of a different color can represent image pixels outside but close to the threshold can indicate a degree of partial similarity to the characteristic skin color, where the indicated shade indicates the amount of processing to be performed on the corresponding image pixels. In an example, grey mask pixels can be used, where the closer to white the grey pixel is, the closer to full skin pixel processing is performed on its image pixel. In one non-limiting example, a 50% grey value can indicate 50% processing for the corresponding image pixel, and so on. In some implementations, a linear continuous gradation in degree can be designated for pixels having a color difference between the similarity threshold and a second threshold that is higher than the similarity threshold, and beyond the second threshold no processing is performed. For example, fully black mask pixels can indicate that the corresponding image pixel has no color similarity to the characteristic skin color and no processing is performed for the corresponding image pixels.

This partial processing for some face mask pixels allows more smooth transitions between processed face mask pixels and non-mask pixels, reducing sharp contrasts or visible borders between these two types of pixels. Other thresholding schemes can alternatively be used, and/or a non-linear reduction in processing can be designated based on color distance past the similarity threshold. For example, a steep falloff in processing can be designated higher than a predetermined difference in color. The same indication of degree of similarity can be used for the mask pixels in the falloff area of the face mask, where corresponding image pixels are forced to have a reducing amount of processing toward the outer edge of the falloff area.

After block 318 is performed, the resulting facial skin mask designates facial skin pixels in the spatial face area and the falloff area which are similar to the characteristic skin color in varying degrees. All other pixels in the facial skin mask are designated as non-facial skin pixels.

In some implementations, the method 300 can be performed separately and independently for each face region identified in the image. Thus, for example, each face region can have its own characteristic skin color determined and its own pixels selected for inclusion in the skin pixels for that face, and in some implementations each face can have a different amount of processing performed, such as a different amount of blur based on characteristics of the associated face or person. Some face regions and faces can be ignored in some implementations and not included in the face mask, based on user input, preferences, or other factors similarly as described above.

Figure 5:
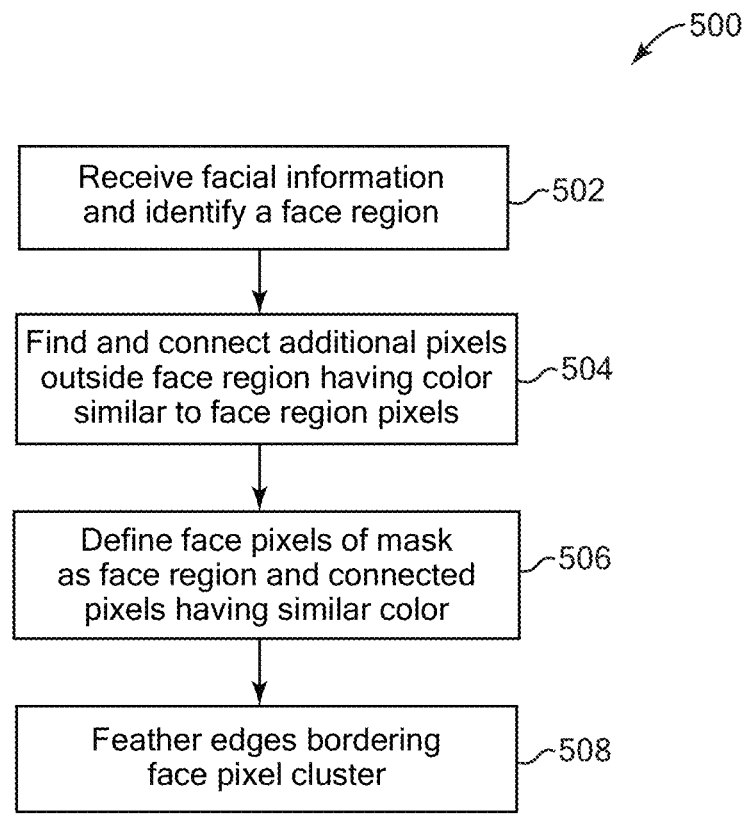
FIG. 5 is a flow diagram illustrating an example method for determining a face image mask that indicates face pixels of an image, according to some implementations.

FIG. 5 is a flow diagram illustrating a method 500 for determining a face image mask that indicates which pixels of an image depict a person's face. Method 500 can be used, for example, in the method 200 of FIG. 2 to determine a face mask in blocks 310 and/or 316. Method 300 can be implemented by a system such as a server and/or client device as described above.

In block 502, the method receives facial information identifying a face region. For example, as described above for block 204 of the method 200, the facial information can describe an identified face that was recognized by a facial recognizer. In some implementations, the face region can be the region inside a face box provided by a facial recognizer, which can be a polygon, rectangle, or other shaped border around landmark features of a face. For example, the face region can be a region that surrounds a person's eyes, cheekbones, nose, and mouth. Furthermore, the facial information can include other information about a face, including one or more coordinates or locations defining facial landmarks such as eyes and mouth. In some implementations, if the face region extends beyond the facial landmarks by a threshold amount or more, the face region can be reduced in size to more closely surround the landmarks.

In block 504, the method finds additional pixels outside the face region that have a color similar to the face region pixels, and connects those additional pixels to the face region. In some implementations, for example, a blobbing technique can be used (e.g., blob extraction or connected-component analysis) starting from one or more pixels in the face region and recursively finding connected similar pixels in directions from the center of the face outwards. In some examples of such a technique, a pixel on the outside edge of the face region can start the process, and the next pixel away from the center of the face region can be examined. One or more of the pixels neighboring the examined pixel can be compared in color to the examined pixel, and if the colors are similar (e.g., within a predetermined color threshold of each other), the examined pixel can be marked with the same label as the similar neighboring pixels. If any of the neighboring pixels are included in the face region, then the examined pixel and any similarly-colored neighbors can be added to the set that includes the face region. Then another previously-unexamined pixel can be examined further from the face region. In this way, additional contiguous skin pixels are added to the face region based on color similarity, until the entire face depicted in the image has been added via connecting pixels. Furthermore, other skin areas can also be included in the mask if connected to the facial skin pixels, such as neckline skin areas of persons, ears, etc. In some implementations, multiple threads can be simultaneously and independently processed, where each thread processes connected pixels in a different region or grid space around the face region, and connected pixels at various locations around the face region are found at the same time or in the same time period. Other implementations can also find other skin areas of a person (e.g., arms, chest, etc.) by looking for other clusters of pixels having a similar color to the face pixels.

Other implementations can use other techniques for finding the facial pixels. In one example, a color range in the face region can be determined (such as the average color, or a characteristic color similarly determined as described above for FIG. 3), and all the pixels in the image can be compared to the face region color range and the pixels having a similar color (e.g., within a threshold color range) can be selected. The face region pixels and any clusters of selected pixels that are connected to the face region pixels are selected as face pixels.

In block 506, a face pixel area of the mask is defined as the face region and the pixels connected to the face region with a similar color, as found in block 504. This area is defined as including face pixels, while the other pixels of the mask are designated as non-face pixels. For example, the designations can be done with a characteristic of the mask pixels, such as color, e.g., white for face pixels and black for non-face pixels. In block 508, the edges bordering the defined face pixel area are feathered by providing a gradient designation within a falloff area outside the face pixel area. For example, similarly as described above with reference to FIG. 3, pixels within the falloff area can be designated to be processed 100% similarly to the inner face mask pixels and processed by a lesser amount the further from the face area a pixel is located, gradually reducing to 0% at the outer edge of the falloff area. In some implementations, the falloff area can be within the previously-defined face pixel area, or in other implementations the falloff area can be added outside the face pixel area border. The resulting face mask including falloff region can then be provided for processing.

In some implementations, the method 500 can be performed separately and independently for each face region identified in the image. Thus, for example, each face region can have its own face pixel area determined based on the individual face region and connected pixels. Some face regions can be ignored in some implementations based on user input, preferences, or other factors similarly as described above.

Other implementations for face mask detection can be used. For example, some images may have a depth map associated with them, indicating various depths or distances from a camera for each feature depicted in the image. Faces and persons depicted in images are typically within the foreground of images. A face mask can be determined based on the face region as described above, and pixels that are known to be in the foreground (e.g., close to the camera within a threshold distance) can be connected to the face region and included in the face pixels of the mask, while pixels in the background (e.g., positioned from the camera outside a threshold distance) can be excluded from the face pixels.

It should be noted that the blocks described in the methods of FIGS. 2, 3 and 5 can be performed in a different order than shown and/or simultaneously (partially or completely) with other blocks, where appropriate. In some implementations, blocks can occur multiple times, in a different order, and/or at different times in the methods. In some implementations, the methods 200, 300 and/or 400 can be implemented, for example, on a server system 102 as shown in FIG. 1. In some implementations, one or more client devices can perform one or more blocks instead of or in addition to a server system performing those blocks.

Figure 6:
FIGS. 6-10 are diagrammatic illustration of examples of processing an example image to determine a face mask and adjust image pixels.

FIGS. 6-10 are diagrammatic illustrations of some examples of processing an example image to determine a face mask and adjust image pixels. Image 600 as shown in FIG. 6 can be the basis for a face mask and adjustment according to one or more implementations described herein. Image 600 can be displayed on a display device, e.g., of a client device 120, 122, 124, and/or 126 of FIG. 1, or a server system 102 in some implementations. In other implementations, the image 600 can be processed as described herein without being displayed or being displayed after all processing is complete. In one non-limiting example, a user can view image 600 in an interface on a client device, e.g., for a social networking service or application.

FIG. 7 shows image 600 after being processed by a facial recognition system or module such that a face region 702 has been identified for a face of the person depicted in the image. The face region 702 is defined by a bounding box 704 that can surround non-skin facial features such as eyes and mouth. Pixels from face region 704 can be used for determining a characteristic skin color (in FIG. 3) or can be used as a starting point for finding connected pixels (in FIG. 5, e.g., using a smaller face region within the face area). Landmarks can also be identified by the facial recognition process, as shown in FIG. 8.

Figure 8:
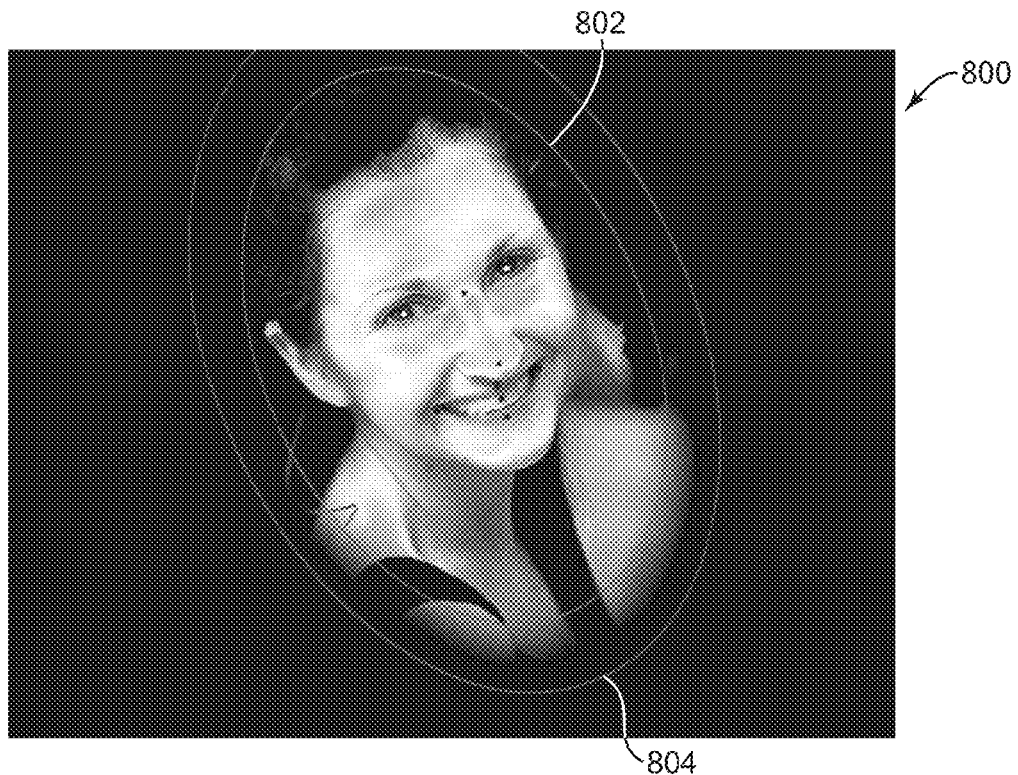

FIG. 8 shows an example face mask 800 after a spatial face area 802 has been determined for the image based on the face region 702 and any other received facial information, as described in block 312 of FIG. 3. Spatial face area 802 surrounds the approximate area of the depicted face. A falloff region 804 has been determined to extend beyond the spatial face area 802 as described for block 314 of FIG. 3. In other implementations, a spatial face area 802 may not have been determined, e.g., as in the method 500 of FIG. 5.

FIG. 8 also shows facial landmark indicators as black dots, which were received from a facial identification process or determined based on facial information. Such landmark indicators can be the center points of the eyes, midpoint between the eyes, four or five border points of the mouth, a point for the tip of the nose, etc. The landmark points can be used in determining a more accurate spatial face area in the method of FIG. 3, for example.

Figure 9:
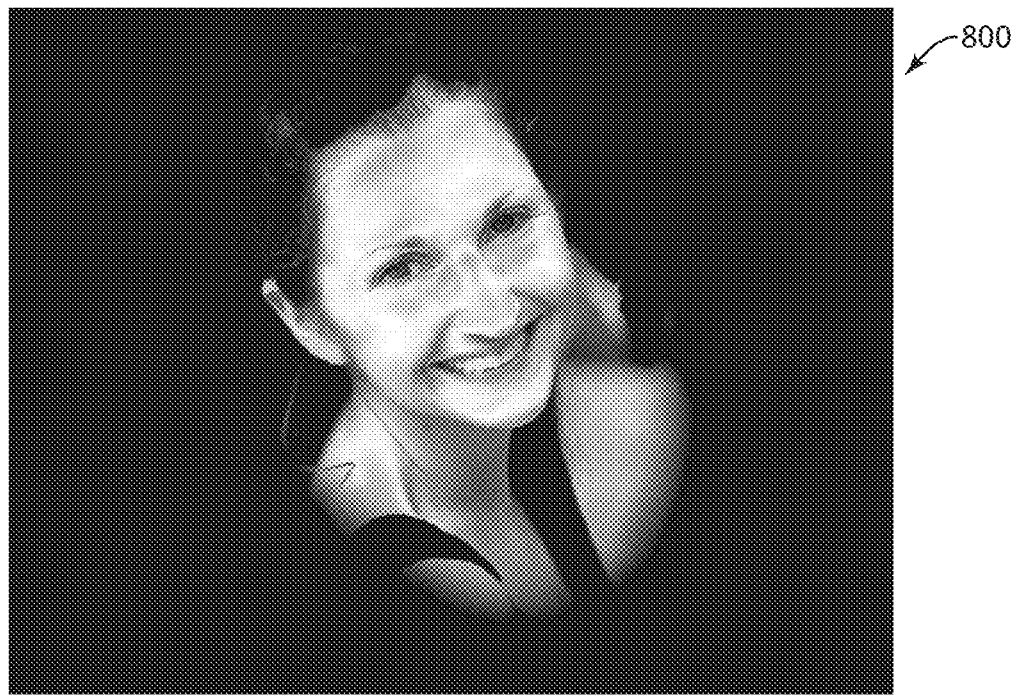

FIGS. 8 and 9 show a resulting example face mask 800 for the example image 600. In this example, face mask 800 is a skin mask determined based on the face region 702 and the spatial face area 802 described above, based on a process of FIG. 3. White pixels in the face mask indicate portions of the image depicting facial skin of the person depicted in the original image 600, where the whiter the pixel, the more fully will that pixel be processed by the later processing operation. Black pixels indicate portions of the image that are not depicting skin. In this example, eyes, mouth, and hair of the user are not included in the skin mask. Gray pixels in the mask 800 indicate a partial designation of skin pixels that are to be processed to a lesser extent in accordance with the gray level of the mask pixel.

Figure 10:

FIG. 10 shows an example of a processed output image 1000 that has been processed and adjusted based on the face mask 800 shown in FIGS. 8 and 9. In this example, the image 1000 has had a Gaussian blur applied to the facial skin pixels indicated by the face mask. This processing smoothes the skin to remove some of the skin features, and does not affect other portions of the image. If the inverse to the face mask were used, the other portions of the image would be blurred instead of the facial skin portions.

Thus, described features allow desired facial and/or non-facial portions of an image to automatically be selected for processing. Users do not need to manually select any regions or boundaries for sampling, masking, or processing. Furthermore, face masks are determined based on spatial face regions and color similarities, allowing for accurate and efficient determination of facial and skin pixels.

Figure 11:
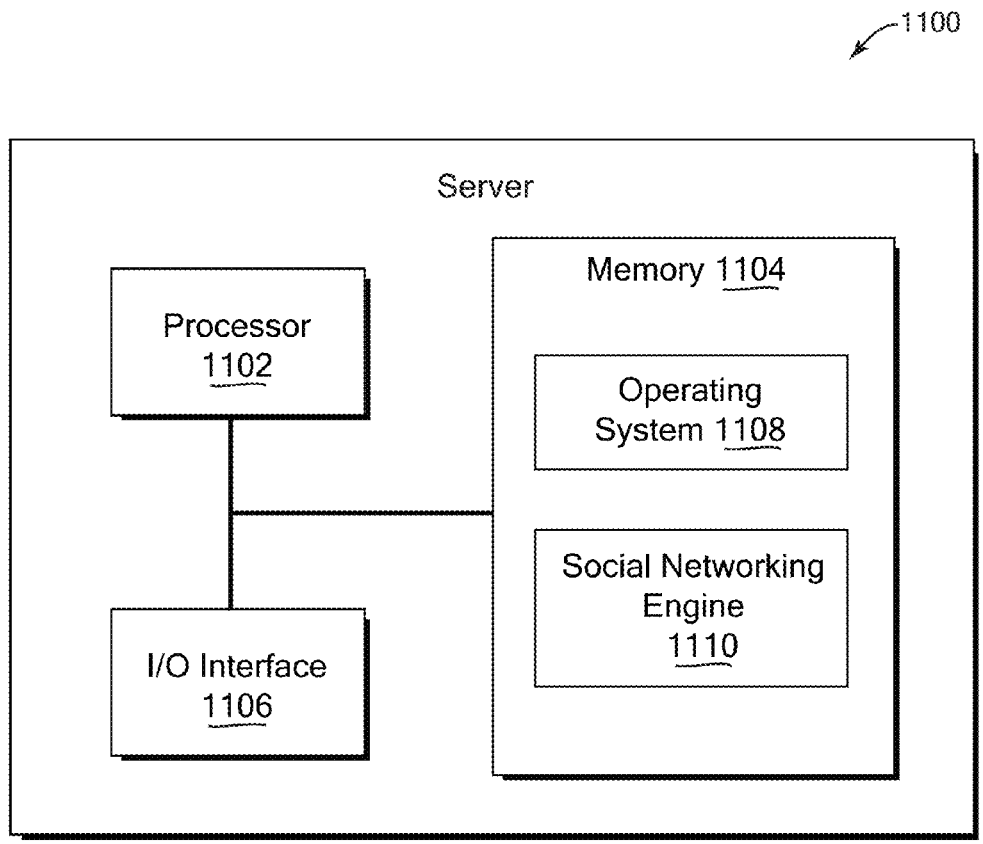
FIG. 11 is a block diagram of an example device which may be used for one or more implementations described herein.

FIG. 11 is a block diagram of an example device 1100 which may be used to implement some implementations described herein. In one example, device 1100 may be used to implement server device 104 of FIG. 1, and perform appropriate method implementations described herein. Server device 1100 can be any suitable computer system, server, or other electronic or hardware device. For example, the server device 1100 can be a mainframe computer, desktop computer, workstation, portable computer, or electronic device (portable device, cell phone, smart phone, tablet computer, television, TV set top box, personal digital assistant (PDA), media player, game device, etc.). In some implementations, server device 1100 includes a processor 1102, a memory 1104, and input/output (I/O) interface 1106.

Processor 1102 can be one or more processors or processing circuits to execute program code and control basic operations of the device 1100. A "processor" includes any suitable hardware and/or software system, mechanism or component that processes data, signals or other information. A processor may include a system with a general-purpose central processing unit (CPU), multiple processing units, dedicated circuitry for achieving functionality, or other systems. Processing need not be limited to a particular geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory.

Memory 1104 is typically provided in device 1100 for access by the processor 1102, and may be any suitable processor-readable storage medium, such as random access memory (RAM), read-only memory (ROM), Electrical Erasable Read-only Memory (EEPROM), Flash memory, etc., suitable for storing instructions for execution by the processor, and located separate from processor 1102 and/or integrated therewith. Memory 1104 can store software operating on the server device 1100 by the processor 1102, including an operating system 1108 and one or more applications engines 1110 such as a graphics editing engine, web hosting engine, social networking engine, etc. In some implementations, the applications engines 1110 can include instructions that enable processor 1102 to perform the functions described herein, e.g., some or all of the methods of FIGS. 2, 3 and/or 5.

Any of software in memory 1104 can alternatively be stored on any other suitable storage location or computer-readable medium. In addition, memory 1104 (and/or other connected storage device(s)) can store privacy settings, content, and other data used in the features described herein. Memory 1104 and any other type of storage (magnetic disk, optical disk, magnetic tape, or other tangible media) can be considered "storage devices."

I/O interface 1106 can provide functions to enable interfacing the server device 1100 with other systems and devices. For example, network communication devices, storage devices such as memory and/or database 106, and input/output devices can communicate via interface 1106. In some implementations, the I/O interface can connect to interface devices such as input devices (keyboard, pointing device, touchscreen, microphone, camera, scanner, etc.) and output devices (display device, speaker devices, printer, motor, etc.).

For ease of illustration, FIG. 11 shows one block for each of processor 1102, memory 1104, I/O interface 1106, and software blocks 1108 and 1110. These blocks may represent one or more processors or processing circuitries, operating systems, memories, I/O interfaces, applications, and/or software modules. In other implementations, server device 1100 may not have all of the components shown and/or may have other elements including other types of elements instead of, or in addition to, those shown herein. While system 102 is described as performing steps as described in some implementations herein, any suitable component or combination of components of system 102 or similar system, or any suitable processor or processors associated with such a system, may perform the steps described.

A client device can also implement and/or be used with features described herein, such as client devices 120-126 shown in FIG. 1. Example client devices can include some similar components as the device 1100, such as processor(s) 1102, memory 1104, and I/O interface 1106. An operating system, software and applications suitable for the client device can be provided in memory and used by the processor, such as client group communication application software. The I/O interface for a client device can be connected to network communication devices, as well as to input and output devices such as a microphone for capturing sound, a camera for capturing images or video, audio speaker devices for outputting sound, a display device for outputting images or video, or other output devices. A display device, for example, can be used to display the settings, notifications, and permissions as described herein, where such device can include any suitable display device such as an LCD, LED, or plasma display screen, CRT, television, monitor, touchscreen, 3-D display screen, or other visual display device. Some implementations can provide an audio output device, such as voice output or synthesis that speaks text in ad/or describing the settings, notifications, and permissions.

Although the description has been described with respect to particular implementations thereof, these particular implementations are merely illustrative, and not restrictive. Concepts illustrated in the examples may be applied to other examples and implementations.

In situations in which the systems discussed here may collect personal information about users, or may make use of personal information, users may be provided with an opportunity to control whether programs or features collect user information (e.g., information about a user's social network, user characteristics (age, gender, profession, etc.), social actions or activities, a user's preferences, or a user's current location). In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, a user may have control over how information is collected about the user and used by a server.

Note that the functional blocks, features, methods, devices, and systems described in the present disclosure may be integrated or divided into different combinations of systems, devices, and functional blocks as would be known to those skilled in the art. Any suitable programming language and programming techniques may be used to implement the routines of particular implementations. Different programming techniques may be employed such as procedural or object-oriented. The routines may execute on a single processing device or multiple processors. Although the steps, operations, or computations may be presented in a specific order, the order may be changed in different particular implementations. In some implementations, multiple steps or blocks shown as sequential in this specification may be performed at the same time.

What is claimed is:

1. A method comprising:
   identifying one or more face regions of an image, the one or more face regions including pixels that depict at least a portion of one or more corresponding faces of one or more persons, wherein identifying the one or more face regions is based on identifications of facial landmarks of the one or more faces;
   determining an associated face mask for each of the one or more faces based on the one or more face regions, wherein each face mask indicates which pixels in the image depict the corresponding face;
   selecting the pixels of the image outside the one or more faces by inversely applying the one or more face masks; and
   providing the selected pixels to a processing operation for adjustment of the selected pixels.

2. The method of claim 1 wherein determining an associated face mask includes adding connected face pixels to each face region, wherein the associated face mask includes approximately the entire corresponding face of a person.

3. The method of claim 2 wherein each of the one or more face regions includes eyes and mouth of one of the persons, and wherein a blobbing technique adds contiguous skin pixels outside each face region to each face region, the skin pixels representing skin of one of the persons, wherein the blobbing technique examines a color of pixels outside each of the face regions and adds pixels to each face region in response to the color being within a predetermined threshold of a color of one or more other pixels adjacent to the pixels.

4. The method of claim 1 wherein determining an associated face mask includes:
   determining an average color of a plurality of pixels within the face region,
   determining a spatial face area approximately defining the corresponding face of the associated person; and
   selecting pixels in the spatial face area that are similar in color to the average color and designating in the face mask that the selected pixels are face pixels.

5. The method of claim 4 wherein the plurality of pixels for which the average color is determined are pixels selected as being within a predetermined range of known skin colors.

6. The method of claim 4 wherein determining a spatial face mask area includes estimating width and height for the spatial face mask area based on predetermined average facial proportions of a plurality of people.

7. The method of claim 1 further comprising providing a falloff region for the face mask in which pixels are designated to be processed by a gradually lessening amount in a direction from a face area to the portions of the image outside the face area.

8. The method of claim 1 wherein the processing operation includes at least one of:
applying a Gaussian blur to the selected pixels; and
applying a local contrast enhancement to the selected pixels.

9. A method comprising:
identifying a face region within an image, the face region including pixels that depict at least a portion of a face of a person;
selecting a plurality of pixels within the face region that are within a predetermined range of colors known to be skin colors;
determining a characteristic skin color for the selected pixels in the face region; and
determining a face mask for the image, the face mask indicating which pixels in the image are skin pixels depicting the person's skin based on a color threshold similarity to the characteristic skin color.

10. The method of claim 9 wherein the characteristic skin color is an average color of the selected pixels in the face region.

11. The method of claim 9 further comprising determining an indication of a distribution of colors of the selected pixels in the face region, wherein the distribution is used in determining a color distance threshold used in the color threshold similarity to the characteristic skin color.

12. The method of claim 11 wherein the indication of a distribution of the colors of the pixels includes a standard deviation.

13. The method of claim 9 wherein the face region is identified based on facial recognition of one or more facial landmarks of the face.

14. The method of claim 9 further comprising determining a spatial face area in the image based on facial landmarks provided from the identified face region, the spatial face area approximately defining the face of the person, wherein the skin pixels in the face mask are limited to pixels within the spatial face area.

15. The method of claim 14 wherein determining a face mask includes determining a falloff area outside the spatial face area, wherein the pixels in the falloff area are evaluated for similarity to the characteristic skin color and are designated to have a gradation of less processing than the pixels in the spatial face area.

16. The method of claim 9 wherein each pixel in the face mask indicates a degree to which a corresponding pixel in the image is similar to the characteristic skin color and a degree of processing for the corresponding pixel.

17. The method of claim 9 wherein selecting a plurality of pixels includes converting colors of the pixels in the face region to a different color space, and checking which pixels in the face region have colors included in at least one predetermined range of the color space indicative of the known skin colors, wherein pixels having colors outside the predetermined area are excluded from the selection.

18. The method of claim 9 further comprising adjusting the skin pixels of the image as designated by the face mask, wherein the adjustment includes a blurring filter to smooth one or more depicted features of the face in the image.

19. The method of claim 9 further comprising inverting the face mask and adjusting the pixels that are not skin pixels of the face mask to process the image.

20. A system comprising:
a storage device; and
at least one processor accessing the storage device and operative to perform operations comprising:
identifying a face region within an image, the face region including pixels that depict at least a portion of a face of a person;
selecting a plurality of pixels within the face region that are within a predetermined range of colors known to be skin colors;
determining a characteristic skin color for the selected pixels in the face region; and
determining a face mask for the image, the face mask indicating which pixels in the image are skin pixels depicting the person's skin based on a color threshold similarity to the characteristic skin color.

* * * * *